US007988767B2

(12) United States Patent
Graham et al.

(10) Patent No.: US 7,988,767 B2
(45) Date of Patent: Aug. 2, 2011

(54) HYDROCARBON BASED SULFUR SOLVENT SYSTEMS AND METHODS

(75) Inventors: Curt Graham, Mission Viejo, CA (US); Robert Henderson, Huntington Beach, CA (US); Richard B. Nielsen, Laguna Niguel, CA (US); Michael Debest, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 200 days.

(21) Appl. No.: 12/376,632

(22) PCT Filed: Aug. 28, 2007

(86) PCT No.: PCT/US2007/018919
§ 371 (c)(1),
(2), (4) Date: Aug. 25, 2009

(87) PCT Pub. No.: WO2008/027381
PCT Pub. Date: Mar. 6, 2008

(65) Prior Publication Data
US 2010/0135880 A1    Jun. 3, 2010

Related U.S. Application Data

(60) Provisional application No. 60/824,253, filed on Aug. 31, 2006.

(51) Int. Cl.
*B01D 53/14* (2006.01)

(52) U.S. Cl. ......... 95/235; 95/181; 208/208 R; 208/210; 208/211; 208/212; 423/573.1; 423/220; 423/242.1; 423/567.1; 96/234; 422/161

(58) Field of Classification Search ................ 95/235, 95/181, 186, 187, 188, 223; 208/208 R, 208/210, 211, 212; 423/220, 242.1, 573.1, 423/567.1

See application file for complete search history.

(56) References Cited

U.S. PATENT DOCUMENTS

| 3,498,887 | A | * | 3/1970 | Politte et al. ............ 203/21 |
| 3,531,160 | A | | 9/1970 | Fisher et al. |
| 3,913,678 | A | | 10/1975 | Blount et al. |
| 4,248,717 | A | * | 2/1981 | Sharp et al. ............ 507/251 |
| 4,290,900 | A | | 9/1981 | Sharp et al. |
| 4,322,307 | A | * | 3/1982 | Kettner ............... 507/263 |
| 4,488,866 | A | * | 12/1984 | Schirmer et al. ........... 431/4 |
| 5,104,557 | A | | 4/1992 | Lindstrom |
| 5,242,672 | A | * | 9/1993 | Yen et al. ............. 423/562 |
| 5,741,469 | A | * | 4/1998 | Bhore et al. ........... 423/244.01 |
| 6,096,195 | A | * | 8/2000 | Streicher et al. ......... 208/254 R |
| 6,303,089 | B1 | * | 10/2001 | Wallace et al. ........... 423/248 |
| 7,041,212 | B2 | * | 5/2006 | White et al. ........... 208/208 R |
| 7,060,233 | B1 | | 6/2006 | Srinivas et al. |
| 7,192,565 | B2 | * | 3/2007 | Briot et al. ............ 423/242.2 |
| 7,597,746 | B2 | * | 10/2009 | Mak et al. ............. 95/169 |
| 7,635,408 | B2 | * | 12/2009 | Mak et al. ............. 95/187 |
| 7,674,444 | B2 | * | 3/2010 | Mak ................. 423/242.1 |

(Continued)

*Primary Examiner* — Duane Smith
*Assistant Examiner* — Pankti Patel
(74) *Attorney, Agent, or Firm* — Fish & Associates, PC

(57) ABSTRACT

Contemplated configurations and methods for elemental sulfur removal from various gases, and especially well acid gases employ a hydrocarbon solvent that dissolves the sulfur to form a rich solvent and that is then regenerated by hydrotreating. Thus, sulfur is removed from the rich solvent as H2S that may then be processed (e.g., in Claus unit or absorption unit) while the regenerated solvent is routed back to the well and associated production pipes.

20 Claims, 1 Drawing Sheet

U.S. PATENT DOCUMENTS

| | | | |
|---|---|---|---|
| 2002/0139713 A1* | 10/2002 | Plummer et al. | 208/208 R |
| 2003/0057136 A1* | 3/2003 | McIntush et al. | 208/209 |
| 2004/0007506 A1* | 1/2004 | Song et al. | 208/244 |
| 2004/0094455 A1* | 5/2004 | Picard et al. | 208/97 |
| 2004/0211706 A1 | 10/2004 | White et al. | |
| 2006/0120948 A1* | 6/2006 | Agarwal et al. | 423/573.1 |
| 2007/0021637 A1* | 1/2007 | Peterson et al. | 585/259 |
| 2009/0317316 A1* | 12/2009 | McLauchlan et al. | 423/243.08 |

* cited by examiner

HYDROCARBON BASED SULFUR SOLVENT SYSTEMS AND METHODS

This application claims priority to our copending U.S. provisional patent application with the Ser. No. 60/824,253, which was filed Aug. 31, 2006.

FIELD OF THE INVENTION

The field of the invention is sulfur removal from gases, and especially removal of elemental sulfur from sour gases of gas wells and associated gas transport systems.

BACKGROUND OF THE INVENTION

Sour gas often contains significant quantities of dissolved elemental sulfur, which tends to precipitate in numerous points during transport, including the well string, the gas gathering system, and in downstream gas treating and gas processing equipment. To avoid such problems, hydrocarbon oils can be injected into the well string or gathering system to solubilize the sulfur in the hydrocarbon liquid phase and to thereby prevent precipitation of the elemental sulfur. Most commonly, aromatic solvents (e.g., alkyl naphthalene) are used as solvents as they typically exhibit a higher sulfur solubility than paraffinic or naphthenic hydrocarbons. A typical example for such a system is described in U.S. Pat. No. 4,322,307.

Regeneration of sulfur laden aromatic hydrocarbon solvents is commonly achieved by contacting the rich solvent with an aqueous solution comprising an amine (e.g., ethylamine). In such systems, the sulfur is converted to a polysulfide and migrates into the aqueous phase, thereby regenerating the hydrocarbon solvent, which is then recycled. The aqueous solution containing the amine and polysulfide/sulfur is then regenerated by distillation to provide an aqueous amine solution as the overhead product and impure, molten elemental sulfur as the bottoms product. For example, U.S. Pat. No. 5,242,672 describes a typical regenerator unit. While such systems generally achieve desirable sulfur reduction in the sour gas, numerous difficulties nevertheless remain. Among other things, regeneration of the solvent using an amine solution requires significant quantities of energy for heating and pumping. Moreover, and depending on the particular sour gas, chemical stability of the amine solution may be less than desirable and require stabilizers and/or replacement of the amine. Also, the polysulfide and/or sulfur obtained from such regeneration may at least in some cases require additional processing to provide a desirable end product.

Alternatively, a dialkyldisulfide can be employed as a sulfur solvent as described, for example, in U.S. Pat. No. 3,531,160. In such systems, the dissolved sulfur is removed via distillation and/or by precipitation with a solvent (e.g., ketones or hydrocarbons) to regenerate the solvent. For high-temperature and high-pressure wells, the alkylsulfide or dialkyldisulfide may be amine activated as described in U.S. Pat. Nos. 4,248,817 or 4,290,900. Regeneration of the solvent is often achieved by precipitation of the dissolved sulfur. Such systems provide some advantages over paraffinic or naphthenic hydrocarbon-based sulfur dissolution systems, however, suffer from other disadvantages. For example, regeneration of the solvents is not always quantitative and, where activated, the solvents may degenerate and lose performance over time, especially under relatively harsh conditions of deep-well gas production. Thus, new solvent must typically be added to maintain desired performance. Further, regeneration in at least some of such systems still requires substantial quantities of energy.

Therefore, while numerous methods of sulfur solvent systems are known in the art, all or almost all of them suffer from one or more disadvantages. Consequently, there is still a need to provide improved systems and methods for sulfur solvent systems.

SUMMARY OF THE INVENTION

The present invention is directed to configurations and methods for removal of sulfur from a solvent that is used to dissolve and/or prevent sulfur deposits in a well and associated piping equipment. In configurations and methods according to the inventive subject matter, the sulfur-rich solvent is hydrotreated to thereby regenerate the solvent and to produce H2S that may then be further concentrated in a downstream process and/or converted to elemental sulfur in a Claus unit. Most preferably, the solvent is a hydrocarbon solvent and comprises a naphthenic hydrocarbon, a paraffinic hydrocarbon, and/or an aromatic hydrocarbon.

In one aspect of the inventive subject matter, a gas production plant comprises a well fluidly coupled to a separator, wherein the separator is configured to separate a well output into a gas portion and a rich solvent portion. A hydrotreater is fluidly coupled to the separator and configured to treat the rich solvent such as to allow production of an H2S product and a regenerated solvent, and a recycling circuit is configured to allow feeding of the regenerated solvent to a topside position of the well, a bottom hole position of the well, and/or a pipe or other conduit transporting the well output to thereby allow formation of the rich solvent portion.

Most preferably, contemplated plants further include a treatment unit fluidly coupled to the hydrotreater and configured to produce a hydrogen-enriched recycle stream and an H2S enriched sour gas stream (e.g., using a membrane separator, a solvent-based adsorption unit, and/or pressure swing adsorption unit), wherein at least in some aspects a Claus unit is further fluidly coupled to the hydrotreater or treatment unit to receive the H2S enriched sour gas stream and to produce elemental sulfur. Depending on the solvent, it is also contemplated that the plant includes a dehydrogenator that is fluidly coupled to the hydrotreater and configured to dehydrogenate at least a portion of the regenerated solvent. Still further, it is contemplated that a bypass may be provided that allows feeding of a portion of the regenerated solvent from a position downstream of the hydrotreater to the well output in a position upstream of the hydrotreater or directly to the hydrotreater to thereby control the hydrotreater temperature.

Therefore, and in another aspect of the inventive subject matter, methods of removing sulfur from a gas well output are also contemplated in which a regenerated solvent is fed to at least one of a topside position of a well, a bottom hole position of the well, and a pipe transporting the gas well output to thereby form a mixed well output that comprises dissolved sulfur. The mixed well output is separated into a rich solvent portion and a gas portion, and the gas portion is then hydrotreated to form an H2S product and the regenerated solvent.

Most preferably, the solvent comprises at least one of a naphthenic hydrocarbon, a paraffinic hydrocarbon, and an aromatic hydrocarbon, and the step of hydrotreating is done under conditions that maintain desaturation of the rich solvent and that convert at least a portion of the dissolved sulfur to H2S. Where desired or necessary, the regenerated solvent may be desaturated, and/or the H2S may be converted back to elemental sulfur in a Claus unit. Still further, it is generally preferred that at least a portion of the regenerated solvent is used as recycle feed in the hydrotreating step.

Therefore, and viewed from a different perspective, a method of regenerating a rich sulfur solvent with a dissolved sulfur concentration of at least 2 wt % (wherein the rich sulfur solvent is provided from a gas well) includes a step of hydrotreating the rich solvent to form an H2S product and a regenerated solvent. Preferably, the H2S product is further processed to produce a hydrogen-enriched recycle stream and an H2S enriched sour gas stream, and at least part of the regenerated solvent is fed to at least one of a topside position of a well, a bottom hole position of the well, and a pipe transporting a well output to thereby form the rich solvent. In particularly preferred methods, the hydrotreating is performed under conditions that maintain desaturation of the rich solvent and that convert at least a portion of the dissolved sulfur to H2S.

Various objects, features, aspects and advantages of the present invention will become more apparent from the following detailed description of preferred embodiments of the invention, along with the accompanying drawing.

DETAILED DESCRIPTION

Figure 1:
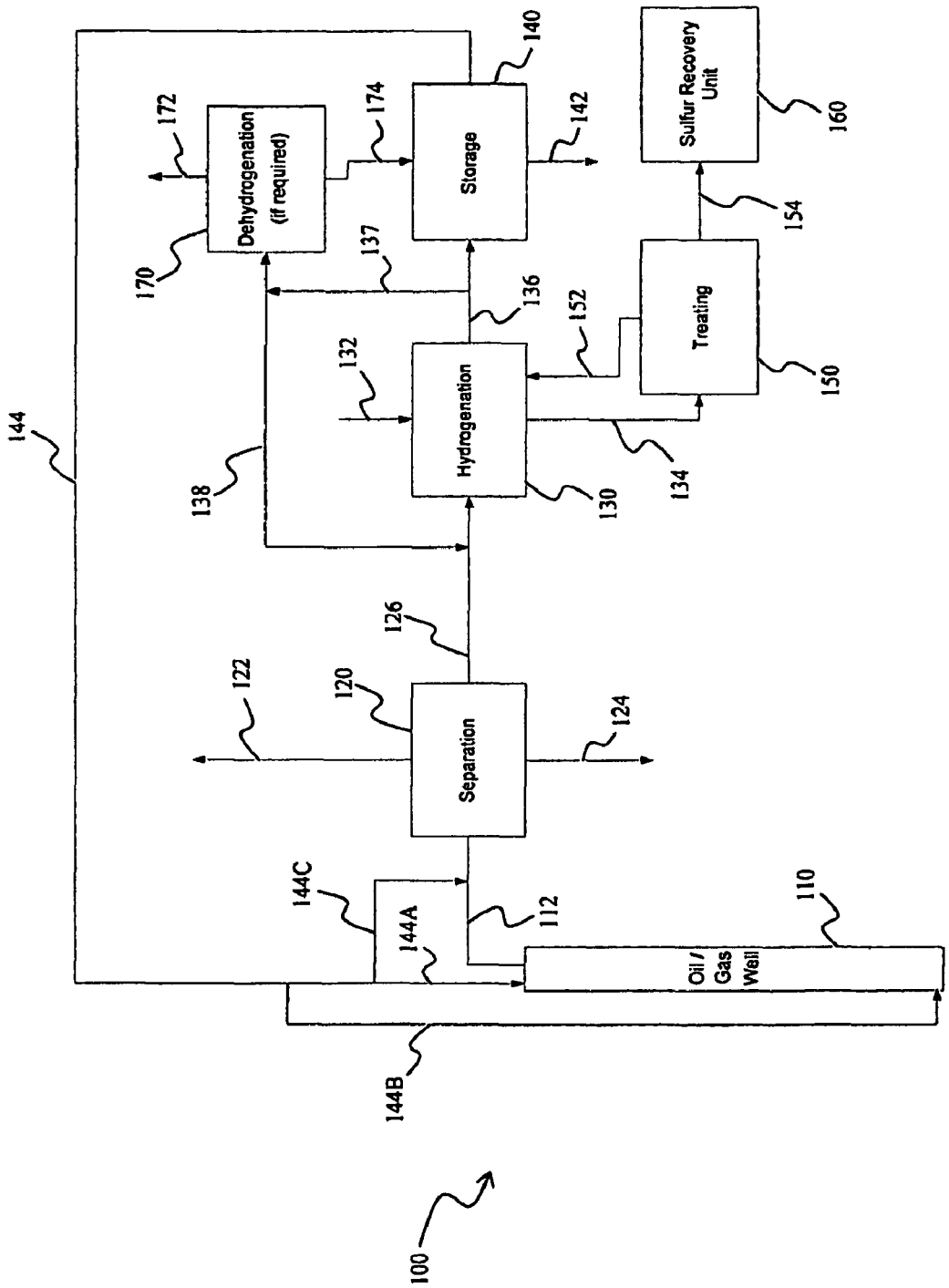
FIG. 1 is a schematic illustration of an exemplary plant configuration according to the inventive subject matter.

The inventors have discovered that sulfur can be simply and effectively removed from a sulfur solvent in a system in which the sulfur-laden rich solvent (typically a hydrocarbon solvent) is regenerated in a hydrogenation reaction that converts sulfur to hydrogen sulfide. The so formed hydrogen sulfide is removed from the hydrotreated solvent and converted to elemental sulfur in a downstream sulfur plant (or otherwise processed), while the regenerated solvent is recycled to the well and associated piping. Most preferably, the hydrogenation reaction is carried out under conditions that allow conversion of the sulfur to hydrogen sulfide while the solvent remains unaffected (typically low temperature and/or pressure). Where desired, at least a portion of the so regenerated solvent can be subjected to a dehydrogenation reaction to restore or adjust the degree of desaturation or aromaticity.

FIG. 1 depicts an exemplary schematic of a sulfur solubilization system 100 where a sulfur free or sulfur depleted hydrocarbon oil is injected into the well string, flow line, and/or gathering system in quantities sufficient to reduce, suppress, and/or even eliminate elemental sulfur deposition. Here, plant 100 includes a production well 110 that produces well output 112. As regenerated solvent 144 is fed to the well head 144A, bottom hole 144B, and/or piping equipment 144C, the well output comprises produced water, sour gas, and solvent with dissolved sulfur (i.e., rich solvent). Well output 112 is routed to the three phase separator 120 that separates the well output into produced water 124, sour gas 122, and rich solvent 126.

Rich solvent 126 is fed to the hydrotreater 130, typically together with a bypass stream 138 that is derived from a position downstream of the hydrotreater (comprising regenerated solvent). Hydrotreater 130 receives a hydrogen stream 132 and produces H2S product stream 134 that is routed to a treatment unit 150 in which a hydrogen recycle stream 152 is separated from the H2S product stream 154. H2S-enriched stream 154 leaves the treatment unit 150 as feed to a Claus plant 160. The majority of the regenerated solvent 136 is then fed to optional surge drum or storage tank 140, while a relatively small bypass stream 137 is routed back to the hydrotreater 130 for temperature control of the exothermic reaction. Most preferably, the quantity of bypass stream 137 is selected such that the hydrotreater operates at a temperature effective to produce H2S from the sulfur, but not to significantly reduce (no more than 10%, more preferably no more than 5%) the degree of desaturation of the solvent. Where solvent desaturation is relatively significant and/or where a relatively high degree of desaturation is desired, dehydrogenation unit 170 may be added in which at least a portion of the regenerated solvent 136 (e.g., via stream 137) is desaturated. The so produced desaturated stream can then be fed as stream 174 to the storage 140 and/or to the hydrotreater 130. Off gas 172 can be routed to a fuel burner, while excess regenerated solvent 142 can be sold as a commodity.

With respect to suitable well systems it is contemplated that all wells and associated equipment (e.g., piping, manifolds, etc.) in which sulfur deposition is a problem are suitable for use in conjunction with the teachings presented herein. However, it is especially preferred that the wells are high-temperature high-pressure gas and/or oil wells. Consequently, the well product composition, pressure, and temperature will vary considerably. For example, the well product pressure may be between 10 and 5000 psig, and more typically between 50 and 2000 psig, and have a temperature of between 50 and 300° F., and more typically between 50 and 200° F. The well product will typically comprise produced water, a sulfur laden hydrocarbon solvent, and sour gas, and is preferably separated in a three phase separator. Depending on the particular configuration and composition of the well product, a two phase separator, dehydrator, and/or other equipment may also be employed. Once separated from the water and/or hydrocarbon oil, the sour gas is sent to one or more gas treating and processing units (not shown) while the produced water is treated for disposal or other use (not shown). Where the well product has a relatively high pressure (e.g., above 300 psig), it should be appreciated that one or more pressure reduction devices may be employed to produce work and where the temperature of the well product is relatively high (e.g., above 200° F.), the heat content may be used in one or more exchangers within the production facility.

With respect to the sulfur solvent, it is generally contemplated that all solvents that solubilize sulfur deposits are suitable for use herein. However, in especially preferred aspects, the solvent is a hydrocarbon oil. It should further be appreciated that the particular nature of the hydrocarbon oil is not critical, but it is generally preferred that the hydrocarbon solvent is a naphthenic, a paraffinic, an aromatic hydrocarbon, or a mixture thereof (most preferably, the hydrocarbon oil is an aromatic hydrocarbon oil due to the high sulfur solubility). The solvent may be derived from co-produced oil (typically refined to specification), or may be supplied from an external source or as make-up oil from other refinery operations at same or other location. Moreover, in less preferred aspects, the hydrocarbon oil may also include an activator (especially where a fraction of the hydrocarbon oil comprises an alkylsulfide or dialkyldisulfide).

The circulation rate of the hydrocarbon oil will typically at least depend on the amount of sulfur deposits that are expected, the sulfur content of the sour gas, the solubility of sulfur in the solvent, and the temperature and pressure conditions in the well and pipe equipment. Lean solvent need not be quantitatively depleted of sulfur and may include residual sulfur content of less than 1 wt %, more typically less than 0.5 wt %, even more typically less than 0.1 wt %, and most typically less than 100 ppm. It should, also be appreciated that various sulfur compounds other than elemental sulfur may be present in the solvent, and especially contemplated sulfurous compounds include mercaptans and COS. Similarly, the amount of sulfur in the sulfur laden rich solvent will typically vary, but is most typically at least 2 wt %, more typically at least 3 wt %, even more typically at least 5 wt %, and most typically at least 10 wt %. Therefore, it should be appreciated that the rich solvent or a portion thereof may also be recycled several times until a desired degree of sulfur saturation is achieved in the solvent.

The sulfur laden hydrocarbon solvent is then sent to a hydrotreater where it is heated and contacted with hydrogen to convert substantially all (e.g., at least 70%, more typically at least 85%, most typically at least 95%) of the sulfur compounds to H2S. Heating of the rich solvent may be done with an exchanger that is thermally coupled to the hydrotreater outlet, or other conventional manner of heating. Similarly, thermal control of the exothermic reaction is preferably achieved by use of a hydrocarbon recycle stream that is used to dilute the feed stream to the hydrotreater (the recycle stream may further be cooled using heat exchange with the well product or other stream within the facility). Make-up hydrogen may be added to the solvent and/or the hydrotreater as required in a conventional manner.

With respect to suitable hydrotreating reactors, it should be appreciated that most commercially available reactor configurations, catalysts, and conditions are appropriate for use herein. However, in particularly preferred aspects, and especially where an aromatic oil is used as the hydrocarbon solvent for removing the elemental sulfur, it should be noted that the hydrotreating reactor is configured to operate at a low enough pressure and temperature to reduce or even eliminate saturation of the aromatic oil. To control the heat of reaction from the hydrogenation, it is typically preferred that a recycle stream of treated oil is admixed with the sulfur laden solvent as shown in FIG. 1. The particular volumes of the steams will depend on various variables, including sulfur content, type of catalyst and pressure in the reactor, etc., and a person of ordinary skill in the art will be able to determine suitable flow ratios without undue experimentation.

In preferred embodiments, the H2S rich gas from the hydrotreater is then sent to a gas treating unit to recover at least some of the hydrogen from the H2S product. Such recovery can be done using a hydrogen selective membrane, a solvent-based process, and/or a pressure swing adsorption process. Regardless of the manner of processing, the H2S product is sent to a sulfur plant (typically Claus plant or similar configuration) or other destination (e.g., process effluent that comprises sour gas) for production of elemental sulfur and/or recovery of the H2S, while the remaining sweetened H2 rich stream from the gas treating unit is returned to the hydrotreater or used in a combustion process.

Regenerated solvent from the hydrotreater is preferably recycled to the gas well and associated piping equipment, and where desired, a surge or storage tank may be implemented to accommodate surplus regenerated solvent. In most preferred aspects, at least a portion of the regenerated solvent is fed back to the hydrotreater or hydrotreater feed for temperature control as discussed above. Additionally, or alternatively, at least a portion of the regenerated solvent may also be fed to a dehydrogenation reactor to obtain or maintain a desired degree of desaturation and/or aromaticity in the solvent. Hydrogen-containing off gases from such reactor can be fed to the hydrotreater, separation unit, and/or a combustor.

Thus, specific embodiments and applications of hydrocarbon based sulfur solvent systems have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A gas production plant comprising:
    a well fluidly coupled to a separator, wherein the separator is configured to separate a well output into a gas portion and a rich solvent portion;
    a hydrotreater that is fluidly coupled to the separator and configured to treat the rich solvent such as to allow production of an H2S product and a regenerated solvent; and
    a recycling circuit that is configured to allow feeding of the regenerated solvent to at least one of a topside position of the well, a bottom hole position of the well, and a pipe transporting the well output to thereby allow formation of the rich solvent portion.

2. The production plant of claim 1 further comprising a treatment unit fluidly coupled to the hydrotreater and configured to produce a hydrogen-enriched recycle stream and an H2S enriched sour gas stream.

3. The production plant of claim 2 wherein the treatment unit comprises a separator selected from the group consisting of a membrane separation unit, a solvent-based adsorption unit, and a pressure swing adsorption unit.

4. The production plant of claim 2 further comprising a Claus unit fluidly coupled to the treatment unit and configured to receive the H2S enriched sour gas stream and to produce elemental sulfur.

5. The production plant of claim 1 further comprising a Claus unit fluidly coupled to the hydrotreater and configured to receive the H2S product and to produce elemental sulfur.

6. The production plant of claim 1 further comprising a dehydrogenator fluidly coupled to the hydrotreater and configured to dehydrogenate at least a portion or the regenerated solvent.

7. The production plant of claim 1 wherein the regenerated solvent comprises at least one of a naphthenic hydrocarbon, a paraffinic hydrocarbon, and an aromatic hydrocarbon.

8. The production plant of claim 1 further comprising a bypass that is configured to allow feeding a portion or the regenerated solvent from a position downstream of the hydrotreater to the well output in a position upstream of the hydrotreater or directly to the hydrotreater.

9. The production plant of claim 1 further comprising a surge tank or storage tank fluidly coupled to the hydrotreater and recycling circuit.

10. The production plant of claim 1 wherein the recycling circuit is configured to allow feeding of the regenerated solvent to at least two of the topside position of the well, the bottom hole position of the well, and the pipe transporting the well output.

11. A method of removing sulfur from a gas well output, comprising:
   feeding a regenerated solvent to at least one of a topside position of a well, a bottom hole position of the well, and a pipe transporting the gas well output to thereby form a mixed well output that comprises dissolved sulfur;
   separating the mixed well output into a rich solvent portion and a gas portion; and
   hydrotreating the rich solvent portion to thereby form an H2S product and the regenerated solvent.

12. The method of claim 11 wherein the solvent comprises at least one of a naphthenic hydrocarbon, a paraffinic hydrocarbon, and an aromatic hydrocarbon.

13. The method of claim 11 wherein hydrotreating is performed under conditions that maintain desaturation of the rich solvent and that convert at least a portion of the dissolved sulfur to H2S.

14. The method of claim 11 further comprising a step of desaturating at least a portion of the regenerated solvent.

15. The method of claim 11 further comprising a step of converting the H2S product to elemental sulfur in a downstream Claus unit.

16. The method of claim 11 wherein at least a portion of the regenerated solvent is used as recycle feed in the hydrotreating step.

17. A method of regenerating a rich sulfur solvent with a dissolved sulfur concentration of at least 5 wt %, wherein the rich sulfur solvent is formed upstream of a separator and provided from a gas well, the method comprising a step of hydrotreating the rich solvent to thereby form an H2S product and a regenerated solvent.

18. The method of claim 17 wherein the H2S product is further processed to produce a hydrogen-enriched recycle stream and an H2S enriched sour gas stream.

19. The method of claim 17 wherein at least part of the regenerated solvent is fed to at least one of a topside position of a well, a bottom hole position of the well, and a pipe transporting a well output to thereby form the rich solvent.

20. The method of claim 17 wherein the hydrotreating is performed under conditions that maintain desaturation of the rich solvent and that convert at least a portion of the dissolved sulfur to H2S.

* * * * *